Jan. 26, 1954

T. E. CONNER 2,667,025

SUCTION PICKUP HEAD UNIT FOR SEED HARVESTERS

Filed Oct. 23, 1950

INVENTOR
Tom E. Conner

BY

ATTORNEYS

Jan. 26, 1954     T. E. CONNER     2,667,025
SUCTION PICKUP HEAD UNIT FOR SEED HARVESTERS
Filed Oct. 23, 1950     2 Sheets-Sheet 2

INVENTOR
Tom E. Conner
BY
ATTORNEYS

Patented Jan. 26, 1954

2,667,025

UNITED STATES PATENT OFFICE 2,667,025

SUCTION PICKUP HEAD UNIT FOR SEED HARVESTERS

Tom E. Conner, Elk Grove, Calif.

Application October 23, 1950, Serial No. 191,647

4 Claims. (Cl. 56—126)

This invention relates generally to improvements in seed harvesters of the type which employ vacuum or suction to pick up the seed from the ground after mowing of the seed crop. This type of harvester is employed in connection with the recovery of clover seed and the like.

In this type of harvester there is employed what is known as a pick-up head unit, which is a device which runs closely along the ground in advance of the harvester, and forms a suction hood by means of which the cut seed crop is lifted by suction from the ground and diverted into a pick-up spout which delivers into the harvester.

It is a major object of the present invention to provide a suction pick-up head unit which is of improved structure and function; the unit acting to assure of a maximum pick-up of the cut seed crop and the delivery thereof into the spout.

Another major object of the present invention is to provide a suction pick-up head unit, for seed harvesters, which is constructed in a manner which permits said unit to closely follow ground contours with advance of the implement; this being an important feature, as it minimizes seed loss.

An additional object of the invention is to provide a suction pick-up head unit, for seed harvesters, which embodies a suction hood of novel design; said suction hood including a floating top plate with an upturned deflector lip at the front, and independently floating end skirts; such floating parts assuring that the head unit may ride over obstacles, yet being provided with stops to normally maintain proper relationship of said parts to the ground.

A further object of the invention is to fit the suction pick-up head unit with vertically adjustable ground engaging wheels, to the end that such adjustment may be employed to initially set such head unit at the most advantageous position relative to ground level; accurate setting of the suction pick-up head unit being requisite to efficient seed recovery.

A still further object of the invention is to mount the suction pick-up head unit, together with the pick-up spout, in pushed, vertically floating relation to the harvester frame.

It is also an object of the invention to provide a suction pick-up head unit for seed harvesters which is designed for ease and economy of manufacture.

Another object of the invention is to provide a practical and reliable suction pick-up head unit for seed harvesters, and yet one which will be exceedingly effective for the purpose for which it is designed.

These objects are accomplished by means of such structure and relative arrangement of parts as will fully appear by a perusal of the following specification and claims.

Figure 1:
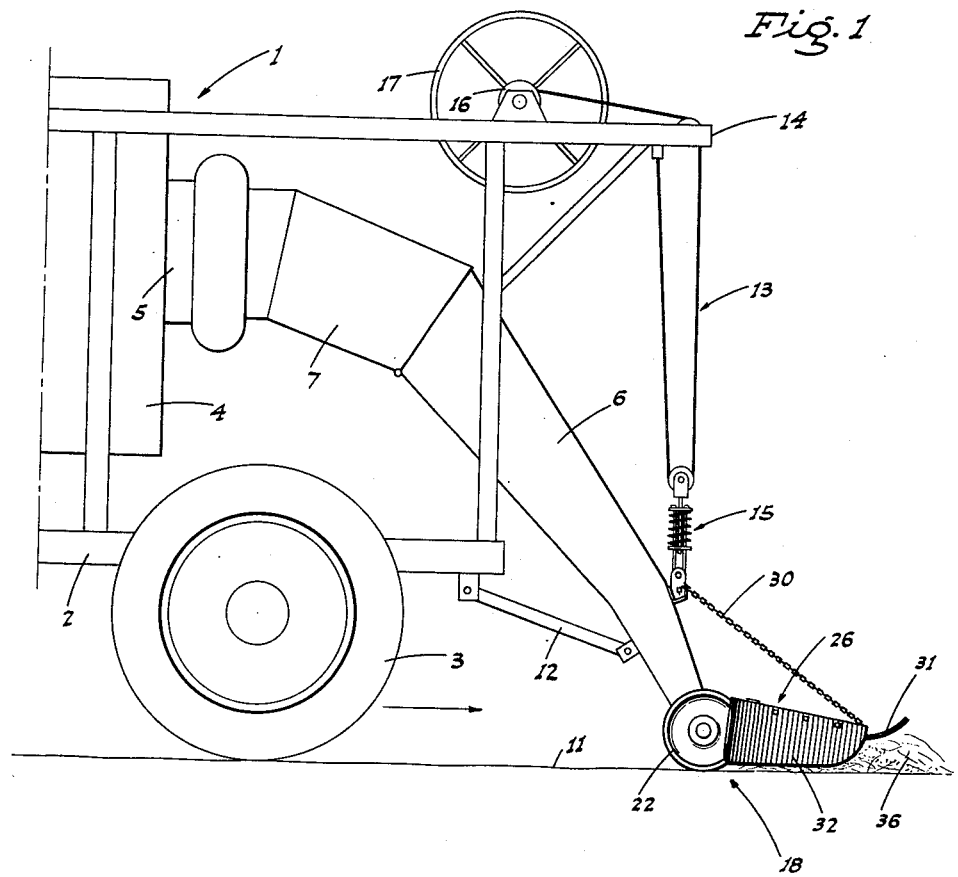
Fig. 1 is a side elevation of the novel, suction pick-up head unit as mounted in connection with a seed harvester; the harvester being shown only in part and somewhat diagrammatically.
Figure 2:
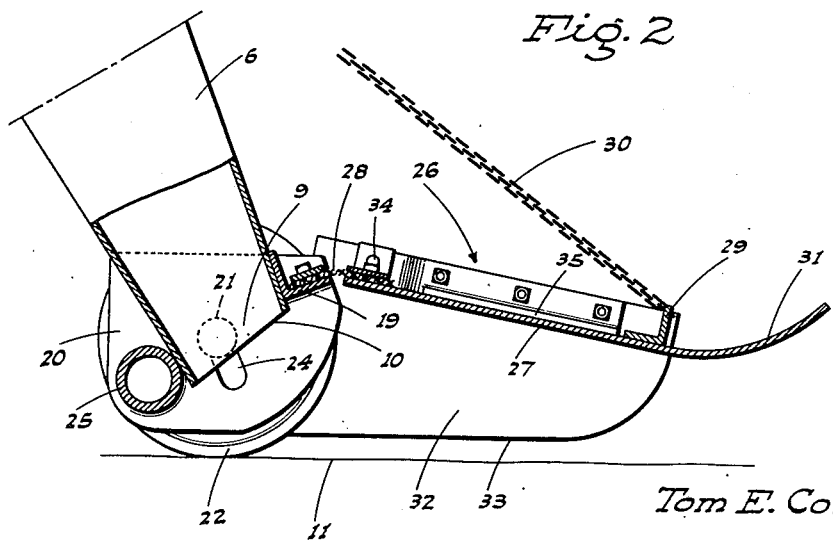
Fig. 2 is an enlarged longitudinal elevation, with parts broken away, of the suction pick-up head unit.
Figure 3:
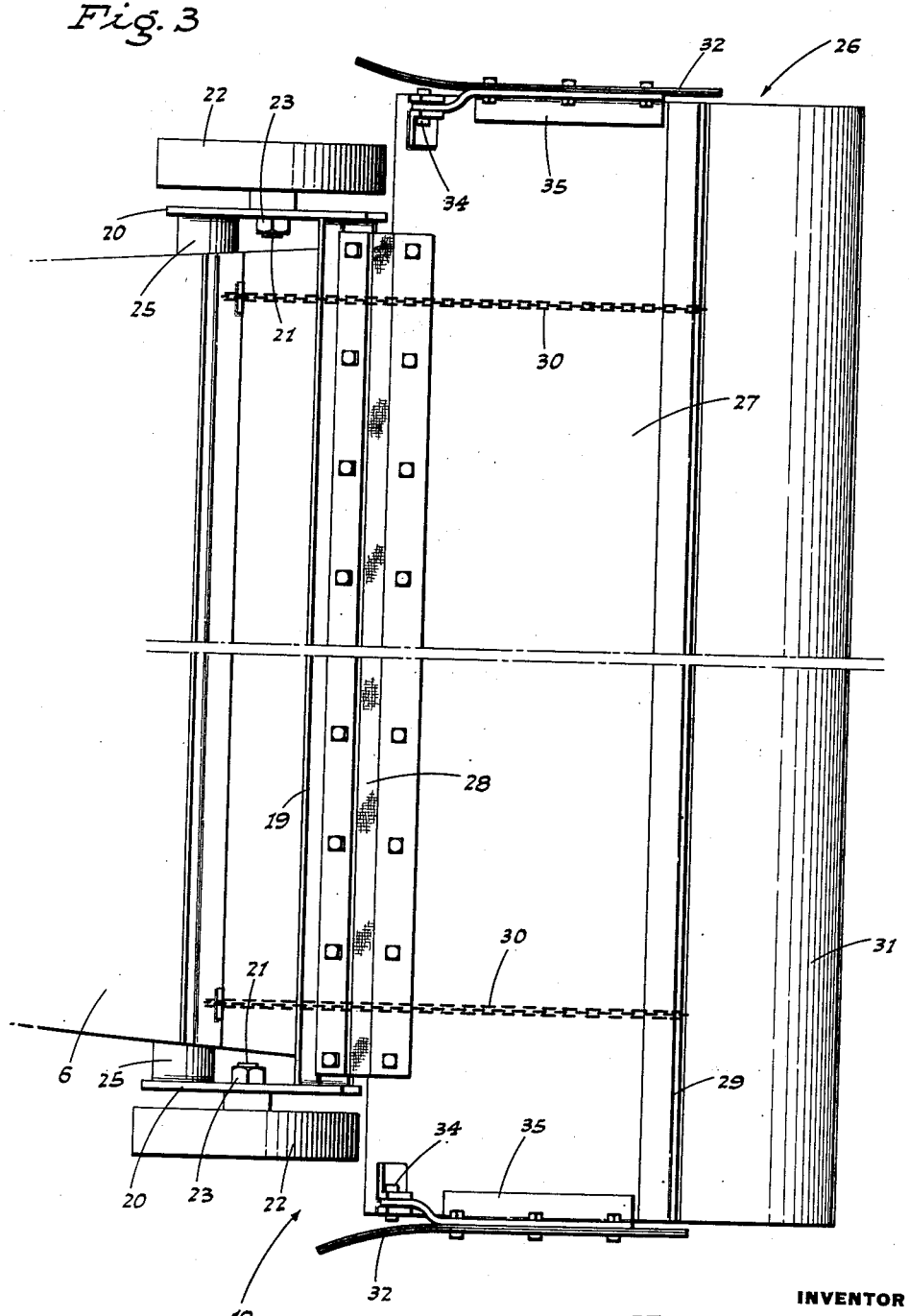
Fig. 3 is an enlarged plan view of said suction pick-up head unit.

Referring now more particularly to the characters of reference on the drawings, the numeral 1 indicates generally the front end portion of the harvester; the harvester including a main frame 2 and front wheels 3.

The main frame 2 supports an engine-driven suction fan, indicated in part at 4, and such suction fan includes a forwardly projecting intake conduit 5 of relatively large diameter.

A pick-up spout 6 projects forwardly and downwardly from the intake conduit 5 to a point adjacent the ground ahead of the main frame 2 and front wheels 3. At its upper end the pick-up spout 6 is cylindrical, as at 7, and is coupled to the intake conduit 5 by a resilient collar 8.

The pick-up spout 6 gradually increases in width and decreases in depth toward its lower end; the lower end portion of said spout being in the form of a wide shallow throat 9 whose mouth or intake opening 10 is disposed at an upward and forward incline from its lower edge; such mouth having said lower edge disposed adjacent but above the ground 11. Transversely spaced, vertically swingable push links 12 are pivotally connected between the front end of the main frame 2 and the back side of the spout 6 adjacent its lower end. Additionally, the lower end portion of the spout 6 is suspended by a cable system 13 which depends from a boom 14 projecting forwardly from the top and front of the main frame 2. The suspension cable system 13 is connected to the spout 6 by a suspension spring unit 15, while the upper end or pull-reach of said cable system connects to a normally locked winch unit 16 which includes a hand wheel 17. By operation of the winch unit 16, through the medium of the hand wheel 17, the spout 6 can be adjusted to desired working position.

The novel, suction pick-up head unit is indicated generally at 18, and is mounted in connection with the lower end portion or throat 9 of the spout 6; such pick-up head unit being constructed and functioning as follows:

An upper, front cross bar 19 is secured on top of the throat 9, extending full width thereof and being affixed, at opposite ends, to vertical end plates 20 which depend, in the nature of baffles, at opposite sides of the mouth 10.

Spindles 21 project laterally outwardly from the end plates 20 and carry relatively small-diameter supporting wheels 22. The spindles 21 are vertically adjustable by means including nuts 23, and adjustment slots 24 in said end plates 20. A lower rear cross beam 25 spans between, and is secured to, the end plates 20 rearwardly of the throat 9.

A suction hood, indicated generally at 26, projects forwardly from the wheel supported throat 9, and includes a top or hood plate 27 which normally extends at a forward and downward incline, as shown; a substantially full width flexible hinge 28 being connected between the front cross bar 19 and said hood plate so as to permit up and down swinging adjustment of the latter.

Adjacent but short of its front edge the hood plate 27 is fitted with a horizontal cross bar 29, and transversely spaced chains 30, adjustable in effective length, connect between said cross bar 29 and relatively elevated points on the front of the pick-up spout 6. With this arrangement the chains 30 limit the down-swing of the hood plate 27, but permit it to float upwardly as working conditions may require; such hood plate, ahead of the cross bar 29, being formed as a forwardly projecting, slightly up-curved deflector lip 31.

At opposite ends of the hood plate 27 there are dependent end skirts 32 which extend lengthwise of the direction of travel, being formed with runner-like lower edges 33.

The dependent end skirts 32 are of heavy-duty sheet rubber or the like and are pivoted, adjacent their upper rear corners, as at 34, in connection with the hood plate 27 whereby to permit said skirts to float vertically in response to engagement with abrupt ground contours or obstacles. Stops 35 along the upper inner edges of the skirts 32 normally ride the top of the hood plate 27 and prevent said skirts from lowering below a predetermined position relative to said hood plate.

Constructed and mounted as described, the suction pick-up head unit 18 can be set to an accurate working position with respect to the ground 11, yet the hood plate 27 and the dependent end skirts 32 may independently float, above their lowermost or stop positions, in response to working conditions.

When the harvester, and the suction pick-up head unit 18 thereon, is in operation a high suction exists in the pick-up spout 6, which in turn creates a corresponding suction within the pick-up head unit 18.

As the harvester advances, the lip 31 assures of the deflection of the cut seed crop, as at 36, into the suction hood 26; i. e. beneath the hood plate 27, and between the dependent end skirts 32. As the cut seed crop thus enters the suction hood 26 it is subjected to the high suction therein and is swept off the ground through the mouth 10 and into the wide shallow throat 9; thence delivering through the spout 6 into the harvester.

The described suction pick-up head unit 18 provides, by reason of its design, a most effective and practical device for the purpose, functioning with high efficiency for the pick-up or recovery of cut seed crop from the ground 11. It is understood, of course, that the seed crop is cut by a mower in advance of passage of the harvester.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A pick-up head unit for the suction spout of a seed harvester, in which spout the lower intake-end throat thereof is of rectangular form in section with its rear wall terminating in a horizontal transverse plane below that of the termination of the front wall so as to define a forwardly facing intake opening; the head unit comprising a suction hood which includes a top plate projecting forwardly with a downward slope from and connected to the spout at a level substantially that of the lower termination of the front wall thereof and side-skirts depending from the top plate; said top plate being provided at its forward end with a full-width upwardly sloping lip.

2. A pick-up head unit for the suction spout of a seed harvester, in which spout the lower intake-end throat thereof is of rectangular form in section with its rear wall terminating in a horizontal transverse plane below that of the termination of the front wall so as to define a forwardly facing intake opening; the head unit comprising a suction hood which includes a top plate projecting forwardly from and connected to the spout adjacent the top of the intake opening thereof, side skirts depending from the top plate, means hingedly and separately mounting the skirts adjacent their rear end on the plate for vertical floating movement, and means on each skirt normally engaging the plate to limit downward movement of the skirt relative to the plate.

3. The combination with a grain pick-up, of a wind-board having front and rear ends, means pivotally connecting the rear end of the wind-board to an upper portion of said grain pick-up, the front end of said wind-board extending a substantial distance beyond said grain pick-up, the front end of said wind-board being curved upwardly providing a curved windrow engaging portion, an attaching chain secured to the front end of the wind-board for effecting vertical movement of said wind-board, and said chain adapted to hold the wind-board in its adjusted position with respect to the grain pick-up.

4. The combination with a grain pick-up, of a wind-board having front and rear ends, means pivotally connecting the rear end of the wind-board to an upper portion of said grain pick-up, the front end of said wind-board extending a substantial distance beyond said grain pick-up, the front end of said wind-board being upturned and providing a windrow engaging portion, and connecting means between the pick-up above the pivot means and the wind-board ahead of said pivot means for effecting vertical movement of the wind-board; said connecting means being adapted to hold the wind-board in an adjusted position with respect to the grain pick-up.

TOM E. CONNER.

References Cited in the file of this patent

UNITED STATES PATENTS

| Number | Name | Date |
|---|---|---|
| 685,111 | Dannelly | Oct. 22, 1901 |
| 1,220,132 | Jenkins | Mar. 20, 1917 |
| 1,370,919 | Schaeffer | Mar. 8, 1921 |
| 2,017,524 | Bolens | Oct. 15, 1935 |
| 2,046,932 | Wyatt et al. | July 7, 1936 |
| 2,493,422 | Sartin | Jan. 3, 1950 |
| 2,502,810 | Waters | Apr. 4, 1950 |

FOREIGN PATENTS

| Number | Country | Date |
|---|---|---|
| 22,035 | Norway | Feb. 19, 1912 |